E. J. & W. R. HUME.
MACHINE FOR MAKING CONCRETE PIPES, COLUMNS, &c.
APPLICATION FILED OCT. 27, 1910.
1,181,452.
Patented May 2, 1916.
3 SHEETS—SHEET 3.
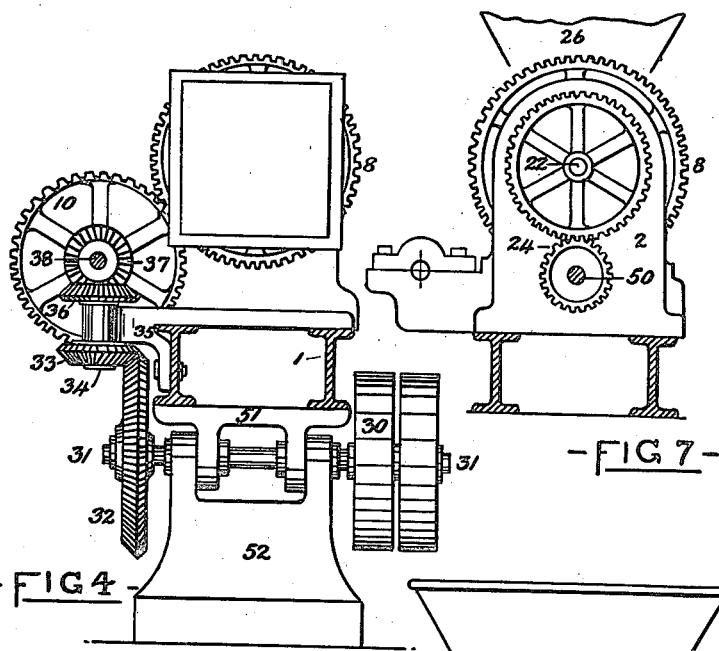
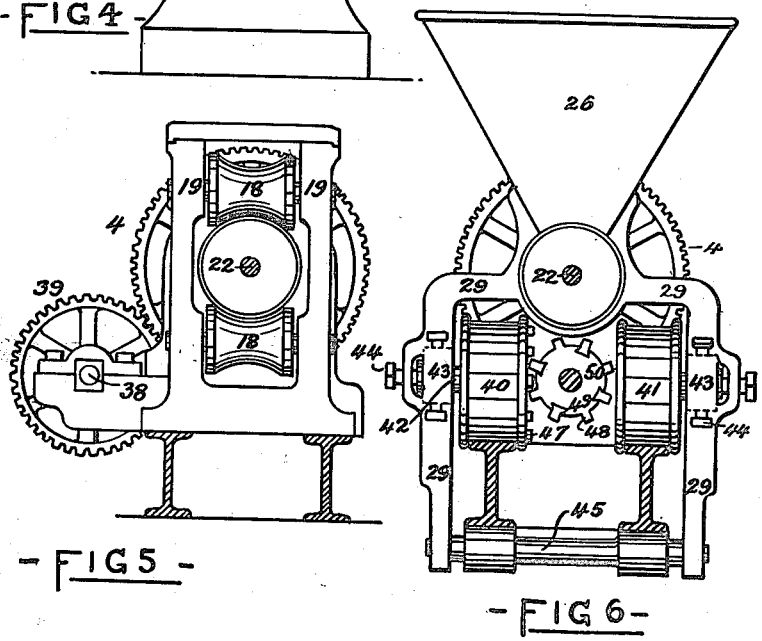
WITNESSES
INVENTORS
Ernest James Hume
Walter Reginald Hume

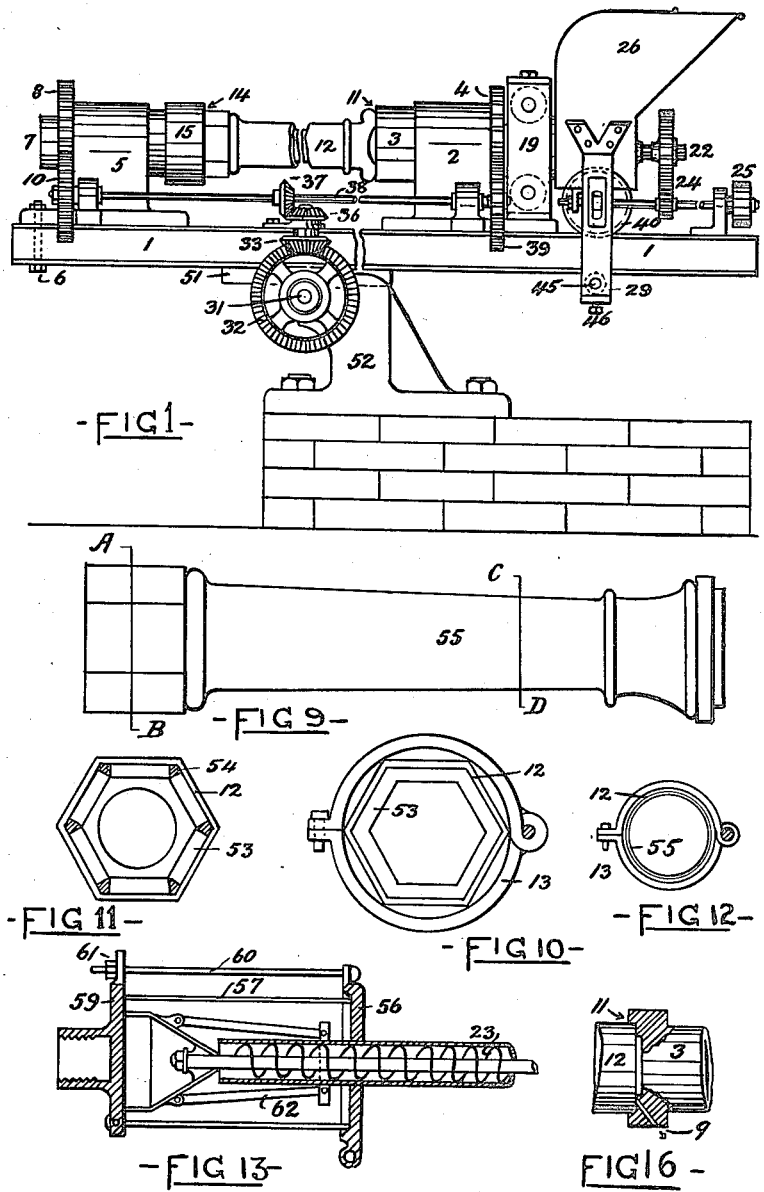

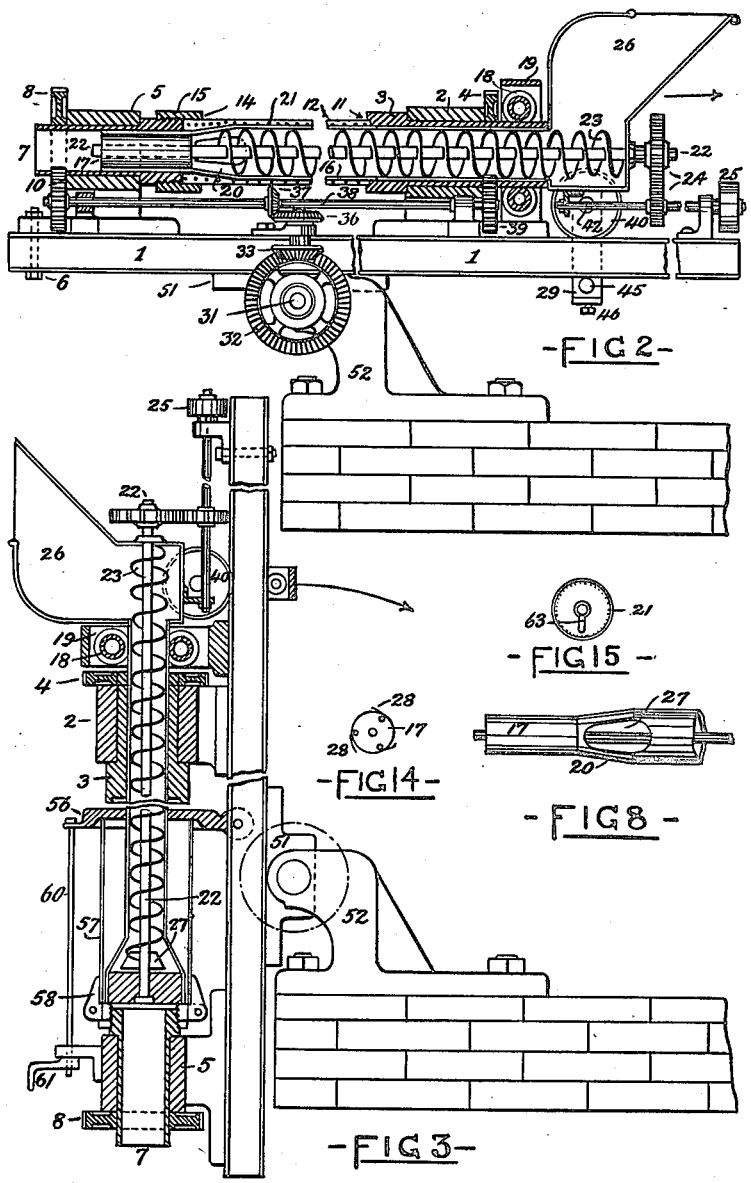

UNITED STATES PATENT OFFICE.

ERNEST JAMES HUME AND WALTER REGINALD HUME, OF ADELAIDE, SOUTH AUSTRALIA, AUSTRALIA.

MACHINE FOR MAKING CONCRETE PIPES, COLUMNS, &c.

1,181,452.

Specification of Letters Patent.

Patented May 2, 1916.

Application filed October 27, 1910. Serial No. 589,356.

*To all whom it may concern:*

Be it known that we, ERNEST JAMES HUME and WALTER REGINALD HUME, subjects of His Britanic Majesty King George the Fifth, residing at Flenders street, Adelaide, South Australia, Australia, have invented certain new and useful Improvements in Machines for Making Concrete Pipes, Columns, &c., of which the following is a specification.

This invention relates to machines for manufacturing concrete pipes, columns, girders, blocks and other structural material, and more particularly to the manufacture of pipes, whether reinforced or otherwise, for water service, drainage and various other purposes, as well as hollow blocks and other hollow structural appliances.

The object of the invention is to more effectively secure the packing of the material from which the pipes and other articles are made, and to reduce the cost of manufacture.

The usual method of manufacturing pipes and the like, whether reinforced or otherwise, is to build the pipe up on a frame or mandrel by means of successive layers of concrete, gradually increasing the thickness from the interior of the pipe outward toward its finished surface, the reinforcement when used being laid in place as the manufacture of the pipe proceeds, or alternatively pipes constructed by ramming concrete into suitably shaped molds. Another method of manufacture at present practised consists in arranging reinforcement in a box or frame and then throwing the concrete in a semi-dry condition into the same, and finally ramming it by any suitable means so as to pack the particles closely together, and allowing the whole to remain stationary until it is set. With our invention, however, we rely upon force for packing the particles of the cement and other material together, the method of procedure being such that by applying such force in the manner as hereinafter described the outside or surface of the pipe or other article to be molded is completed first, the inner portion being gradually filled in or built up until the complete pipe or other article is made, the reinforcement when used being placed in position and bedded into the structure during the progress of manufacture. The solids or heavier particles of the material are automatically arranged according to specific gravity, commencing from adjacent to the outer surface of the pipe and gradually increasing in thickness toward the center.

In order that our invention may be clearly understood we will now proceed to describe the same by aid of the accompanying illustrations which represent a machine and parts connected therewith for carrying the operation into effect.

In the accompanying drawings Figure 1 is an external side view of our machine in horizontal position, Fig. 2 is a side elevation of a similar machine in part section, in horizontal position, Fig. 3 is a side elevation of machine in vertical position, Fig. 4 is a cross section of machine in vertical position through the molding box, Fig. 5 is a cross section view through feed box showing roller guides, Fig. 6 is a cross section showing feed hopper, saddle and traverse, Fig. 7 is a cross section showing driving gear for Archimedean feed screw, Fig. 8 is a side view of discharge end of casing, Fig. 9 is a side view of a column-shaped casing, Fig. 10 is a cross section through A—B of Fig. 9, Fig. 11 is a cross section of A—B of Fig. 9 showing alternative method of construction, Fig. 12 is a cross section through C—D of Fig. 9, Fig. 13 is a sectional sketch of square casing for molding hollow blocks or bases of columns. Fig. 14 is an end view of discharge end of casing, Fig. 15 is an end view of casing with straight-edge substituted for feed screw, and Fig. 16 is a section of portion of rotary stock showing outlet for water.

Throughout the drawings similar numerals of reference are used to denote similar or corresponding parts wherever they occur.

In the drawings 1 is the bed of the machine, upon which a fixed head 2 is securely mounted. This head may be regarded somewhat as the head of a hollow lathe, and is provided with a rotary stock 3, to which motion is imparted by means of any suitable gearing such as the toothed wheel 4.

The tail-stock is shown at 5 and is capable of sliding upon the bed 1 for adjustment purposes and may be fitted with any suitably designed clamp 6. The tail-stock is also hollow and is provided with a sliding hollow rotary spindle 7, which said spindle is fitted with gearing such as the toothed wheel 8 which receives motion from a main driving shaft 38 and driving wheels 10 so that the rotary stock and the hollow spindle are driven in the same direction and at the same speed as each other.

In the stock and in the spindle recesses are formed at 11 and 14 for the reception and support of a shell or casing 12, an outlet for superfluous water being arranged at 9 (in Fig. 16). This shell or casing may be of thin sheet metal and can be either overlapped and provided with intermediate clamps such as 13 (Figs. 10 and 12) or may be furnished with closely fitting hinged portions, the edges of which are likewise closely brought together so as to be clamped in order to form a perfect outer shell or casing which is capable of being opened out when so desired. The inner diameter of this outer shell or casing represents the external diameter of the pipe, column or other article which it is intended to manufacture, and the ends of such shell or casing are accommodated in the recesses 11 and 14 as will be well understood on reference to the drawings, several recesses of varying diameters being provided at each end of the machine for the accommodation of casings of different sizes. The recess 14 is formed and rendered accessible by the adjustable screw ferrule 15.

The internal construction of the machine comprises a hollow cylindrical mandrel 16 having a guide end 17 which sits in the hollow spindle 7 at the tail end of the machine, the opposite end of the mandrel being preferably supported by concave bearing wheels 18, which are arranged in a suitable fixed frame 19. The tail end of the cylindrical mandrel 16 is partially coned at 20 to give clearance for a layer of reinforced material, and is secured to the body portion of the hollow mandrel. The exterior of the hollow mandrel affords support to the reinforcing material 21 of any suitable predetermined size or structure.

Throughout the length of the hollow mandrel a feed spindle 22 is arranged and is fitted with an Archimedean screw feed 23 which is rotated by gearing wheels 24 which are driven from the belt wheel 25. The screw receives a supply of mixed concrete through the feed hopper 26 or other transmitting means which is in communication with the hollow mandrel by means of a suitably disposed hole or opening in its base as illustrated. Exit holes 27 are arranged at the guide end of the spindle through which the concrete leaves the hollow mandrel and gains access to the shell or casing 12 through and around reinforcement.

At the extremity of the guide end we provide trowels 28 (Fig. 14) preferably consisting of leaf springs for smoothing the interior of the work as hereinafter explained. The hollow mandrel together with its hopper and feed screw device is mounted on a slide or carriage 29 (Fig. 6) and being guided in the head stock is caused to traverse backward or forward as desired by means of any suitable mechanism which is operated from the principal driving gear as will be readily understood from the drawings, the wheels of the carriage which carries the hopper and mandrel being arranged with adjusting screws for horizontal and vertical adjustment to secure the utmost accuracy of working.

The general arrangement of the principal driving gear will best be seen on reference to Figs. 1 and 4. Motion is imparted from any suitable power to the belt wheels 30, which in turn transmit it through the shaft 31 to the beveled wheel 32 which gears into the beveled wheel 33 which is mounted on a spindle 34 contained in a suitable bearing 35, the upper end of the same spindle being fitted with a transmission wheel 36, which passes the motion on to the beveled wheel 37. This wheel being rigidly mounted on the driving shaft 38 conveys motion thereby to the toothed wheels 10 and 39 whereby the wheels 8 and 4 receive their motion at equal rates of speed, and thus cause a rotation of the hollow casing 12, inside of which pipes, columns and the like are formed. The Archimedean feed screw 23, the hopper 26 and parts connected therewith, are separately driven from the belt wheel 25 or from a similarly placed chain wheel which may be geared with a wheel or an extension of the main driving shaft 38. The hopper and its associated parts are capable of being moved backward and forward along the bed, for which purpose the supporting wheels 40 and 41 are mounted upon the axle 42, which is set in bearings rendered adjustable both horizontally and vertically by the aid of suitably disposed set screws 44. As previously stated the hollow cylindrical mandrel 16 which is directly connected with the hopper gear rests upon the wheels 18, but to further steady the movement the roller 45 is provided and rests in bearings in the lower portion of the frame 29, and may be adjusted by aid of the set screws 46.

The traverse of the hopper may be achieved in various ways, one of which will be clearly seen on reference to Fig. 6, wherein projecting teeth 47 are arranged upon the side of the wheel 40, and are designed to mesh with teeth 48 which are mounted upon or formed integral with the disk wheel 49 which is keyed to the shaft 50, such shaft being common to the belt wheel 25 and the toothed wheels 24. This arrangement enables a slow traverse motion to be imparted to the wheels 40 and 41, and is proportional to the requisite speed of the Archimedean feed screw 23. The number of teeth in the disk wheel may be varied either by the withdrawal of intermediate keyed teeth or by the use of interchangeable disk wheels.

On reference to Fig. 3 of the drawings it will be seen that the operative parts of the machine are placed in a vertical position. This effect is achieved by mounting the superstructure on a suitable base casting 51, which acts as a trunnion and rotates upon hollow bearings in the foundation block 52, through which the shaft 31 also passes. It will thus be seen that the machine is capable of doing its work in a vertical position as well as in a horizontal position which is advantageous for certain classes of structure.

It is to be understood that the hollow mandrels are capable of receiving a great variety of differently shaped molds, either for the construction of pipes, entire columns and the like or for parts thereof, for instance,—the column casing in Fig. 9 represents several different classes of structure, as will be readily seen from the sections in Figs. 10, 11 and 12. In Fig. 10 the hexagonal base 53 is shown as molded in one piece, while in Fig. 11 the same base is indicated, but the sides thereof are molded as separate slabs to be subsequently joined together or otherwise, their separation in the machine being effected by the chocks 54 which are inserted in the angles of the casing. In Fig. 12 the molding of the shaft of the column 55 is indicated, the mold being surrounded by the strap 13.

For the construction of slabs and plates we prefer to use the mold in the vertical position indicated in Fig. 3. In the said figure and in Fig. 13 modifications of the mold are shown, that is to say, the hinged cover plate 56 grips the walls of the casing 57 which are also hinged at 58 as indicated in Fig. 3, or may be set solid with the end plate 59 as shown in Fig. 13, the end plate being capable of being screwed into position on the tail stock as is the case with the adjustable screw ferrule 15 shown in Figs. 1 and 2 of the drawings.

In Figs. 3 and 13 a locking rod 60 is shown, which by aid of the screw nut 61 enables the hinged cover plate or bearing 56 to hold the casing 57 firmly in position. In Fig. 13 supports are provided at 62 for the tail end of the cylindrical mandrel 16.

The method and operation when the machine is in the vertical position is substantially the same as is the case when the machine is placed horizontally.

The method of carrying our process into effect is as follows: The shell or casing of requisite diameter and shape having been adjusted in the grooves 11 and 14 is well clamped so as to prevent it from opening out, the reinforcement having first been placed in position indicated in Fig. 2 of the drawings. The hopper is withdrawn so that the discharge opening 27 and the core 17 lie within the rotary stock 3. The hopper is then replaced to the position shown in Figs. 1, 2 and 3 so that the core 17 lies in the tail stock and the discharge opening 27 is opposite to the end of the shell or casing 12. Motion is then imparted to the main driving shaft so that the wheels 4 and 8 cause the rotary stock 3 and the hollow spindle 7 to revolve at high speed, the shell or casing being also caused to rotate in unison therewith, the ends of such casing being properly clamped in the rotary stock and hollow spindle. The concrete to be used in the operation is then passed into the hopper 26 in a semi-liquid state and is fed by means of the Archimedean screw through the hollow mandrel until it emerges through the openings 27. During this operation of the process motion has been imparted to the Archimedean screw for feed purposes, but the carriage 29 with its hopper 26 remains stationary until the concrete commences to be ejected from the openings 27, whereupon the carriage is thrown into motion and traverses slowly backward in the direction of the arrow head, the speed of traverse being proportional to the rate of discharge, which said rate of discharge will be varied according to the diameter and thickness of the pipe which it is desired to manufacture. As the concrete is ejected from the mandrel and falls into the shell or casing 12 it is operated upon by the force of the machine and is thus caused to pack tightly against the shell or casing, the particles of the concrete automatically finding their way around and about the reinforcement and ultimately embedding the reinforcement. Meanwhile the traverse of the carriage draws the hollow mandrel outward, leaving the concrete behind, the inner surface of the pipe which is thus formed being left the same diameter as the guide end 17 and being smoothly troweled off by the spring trowels 28. The guide end acting as a core determines the size of the inner diameter of the pipe.

The operation of the machine is continued until the guide end is clear of the shell or casing, after which the feeding of the concrete is allowed to cease, but the rotation of the shell may be continued until the concrete is sufficiently set to enable it to be handled with safety. Thereafter the shell or casing is removed from the machine and another casing is inserted in its stead, and the operation thus described is repeated as often as desired. When the concrete is practically dry the casing may be opened and the pipe removed therefrom, when it will be found that a perfect packing of the particles has taken place, both the outside and the interior of the pipe being smooth and even.

In lieu of the usual metal reinforcement textile material, fiber, hair and the like may be introduced into the structure, and the mass can be strengthened in a variety of ways by the introduction of round rods, wire, woven mesh, and stamped or expanded metal sheets. If stamped or expanded metal is used in pipe making for reinforcement, the mold or outer casing can be constructed in hinged sections as a permanent attachment to the machine, because when the pipe is withdrawn therefrom the expanded metal will afford sufficient stability to enable the pipe to be handled with perfect safety without necessitating the continued support of the mold until dry.

In connection with the foregoing specification the drawings to great extent indicate the manufacture of material in horizontally placed molds, but Fig. 3 indicates the manufacture by centrifugal force applied in vertical construction. The tilting of the machine enables surplus water to be drained off from the bottom by gravity by slacking the bolts which hold the shell or casing after the work has been completed, but before its final removal from the machine irrespective of the exit holes 9 in the head stock.

In the manufacture of small pipes with or without reinforcement a solid core of smaller diameter than the intended internal diameter may be substituted for the Archimedean screw feed. In such cases the concrete is placed in the hopper while the machine is in a horizontal position. The machine is then tilted to a vertical position. By this means the concrete is carried into the mold by gravitation.

In the manufacture of extremely small pipes and in molding difficult shapes, even the core may be dispensed with, as the surplus water contained in the mixture will act as a core, but will drain off during the slowing down of the machine while in a vertical position.

In concrete pipes, columns, girders, blocks and other structural material, and method of and means for manufacturing the same we claim—

In a machine for manufacturing concrete pipes and the like, a tail stock, a hollow spindle, a casing or shell interposed between and having its ends supported by said tail stock and spindle, means engaging with and positively rotating said tail stock and spindle, and means for delivering concrete into said casing or shell comprising a hollow mandrel with means for endwise movement thereof within said shell or casing, said mandrel having a conical portion near its tail end, said conical portion being provided with openings for the discharge of the concrete to the interior of said shell or casing.

In testimony whereof we have affixed our signatures in presence of two witnesses.

ERNEST JAMES HUME.
WALTER REGINALD HUME.

Witnesses:
JOHN HUBER COOKE,
HARRY LAYCOCK.